US008747665B2

(12) United States Patent
McKenzie

(10) Patent No.: US 8,747,665 B2
(45) Date of Patent: Jun. 10, 2014

(54) FILTER CONTAINER, ASSEMBLY, AND METHOD FOR MANUFACTURING THE SAME

(75) Inventor: Darrell T. McKenzie, Gastonia, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 1657 days.

(21) Appl. No.: 11/626,586

(22) Filed: Jan. 24, 2007

(65) Prior Publication Data

US 2008/0173578 A1 Jul. 24, 2008

(51) Int. Cl.
*B01D 27/08* (2006.01)
*B01D 35/30* (2006.01)

(52) U.S. Cl.
USPC ............................ 210/232; 210/444; 210/767

(58) Field of Classification Search
USPC ........................................ 210/232, 444, 767
See application file for complete search history.

(56) References Cited

U.S. PATENT DOCUMENTS

| | | | |
|---|---|---|---|
| 5,104,537 A | 4/1992 | Stifelman et al. | |
| 5,342,519 A | 8/1994 | Friedmann et al. | |
| 5,548,893 A | 8/1996 | Koelfgen | |
| 5,556,542 A | 9/1996 | Berman et al. | |
| 5,685,985 A * | 11/1997 | Brown et al. | 210/450 |
| 5,770,054 A | 6/1998 | Ardes | |
| 5,922,196 A | 7/1999 | Baumann | |
| 6,006,924 A | 12/1999 | Sandford | |
| 6,177,003 B1 | 1/2001 | Jainek et al. | |
| 6,506,303 B1 | 1/2003 | Gustafsson et al. | |
| 6,533,933 B1 * | 3/2003 | Stankowski et al. | 210/232 |
| 6,626,299 B1 | 9/2003 | Brown et al. | |
| 6,635,175 B2 | 10/2003 | Stankowski | |
| 6,752,924 B2 | 6/2004 | Gustafson et al. | |
| 6,830,683 B2 * | 12/2004 | Gundrum et al. | 210/232 |
| 7,022,228 B2 * | 4/2006 | Hennes et al. | 210/232 |
| 7,029,575 B1 | 4/2006 | Baumann et al. | |
| 2004/0140255 A1 | 7/2004 | Merritt et al. | |
| 2004/0159600 A1 | 8/2004 | Stankowski | |
| 2004/0182777 A1 * | 9/2004 | Stankowski et al. | 210/455 |
| 2006/0157403 A1 | 7/2006 | Harder et al. | |

FOREIGN PATENT DOCUMENTS

| | | |
|---|---|---|
| WO | WO 03020398 A1 * | 3/2003 |
| WO | WO-03020398 | 5/2003 |
| WO | WO-2004033067 | 4/2004 |
| WO | WO 2004033067 A2 * | 4/2004 |

OTHER PUBLICATIONS

Office Action dated Oct. 2, 2009, relating to U.S. Appl. No. 12/337,695.
Office Action dated Oct. 6, 2009 relating to U.S. Appl. No. 11/626,586.

* cited by examiner

*Primary Examiner* — Thomas M Lithgow
(74) *Attorney, Agent, or Firm* — Honigman Miller Schwartz and Cohn LLP

(57) ABSTRACT

A filter container includes a wall portion defining a cavity that is adapted to receive a filter. The wall portion includes an inner surface defining the cavity. One or more filter retaining elements integrally-extend from the inner surface that provides a shoulder having an interface surface for interfacing with the filter.

14 Claims, 14 Drawing Sheets

FILTER CONTAINER, ASSEMBLY, AND METHOD FOR MANUFACTURING THE SAME

FIELD

The disclosure generally relates to filters and to a filter container, a filter assembly, and a method for manufacturing the same.

BACKGROUND

Known filter assemblies typically include a filter media that is utilized to filter a fluid medium, such as, for example, engine oil, air, or the like for an internal combustion engine. Accordingly, the filter media may substantially remove foreign particulates, contaminates, and the like from the fluid medium to reduce the potential of upsetting or degrading the performance of an internal combustion engine.

Additionally, known filter assemblies typically include a container that houses the filter media. In order to maintain a desired positioning of the filter media in the container, separate filter media retaining components, fasteners, and the like are typically included in a conventional filter assembly.

Although adequate in performing the function of maintaining the filter media in the container, such retaining components, fasteners, and the like can increase the number of parts and assembly time of known filter assemblies.

BRIEF DESCRIPTION OF THE DRAWINGS

The present disclosure will now be described, by way of example, with reference to the accompanying drawings, in which.

DETAILED DESCRIPTION

Figure 1A:
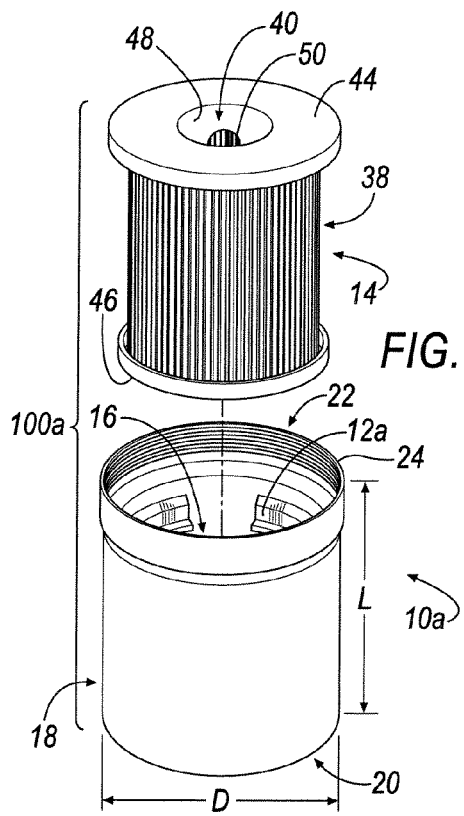
FIG. 1A is an exploded view of a filter assembly in accordance with an exemplary embodiment of the invention.
Figure 1B:
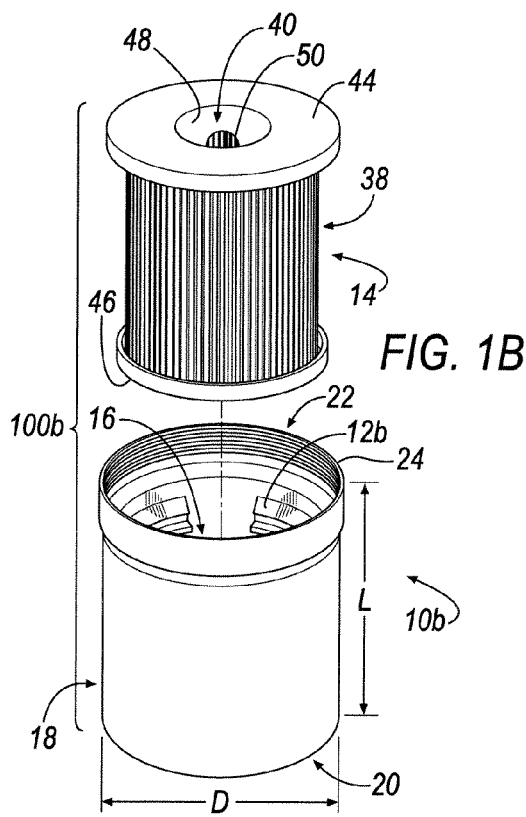
FIG. 1B is an exploded view of a filter assembly in accordance with an exemplary embodiment of the invention.
Figure 1C:
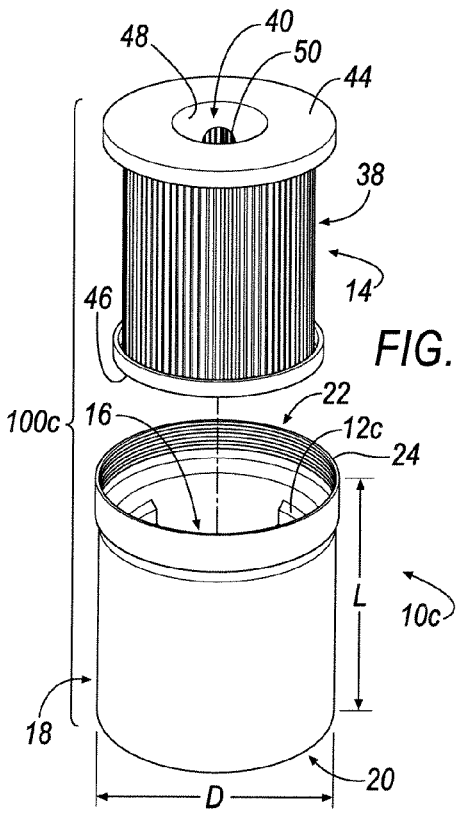
FIG. 1C is an exploded view of a filter assembly in accordance with an exemplary embodiment of the invention.
Figure 1D:
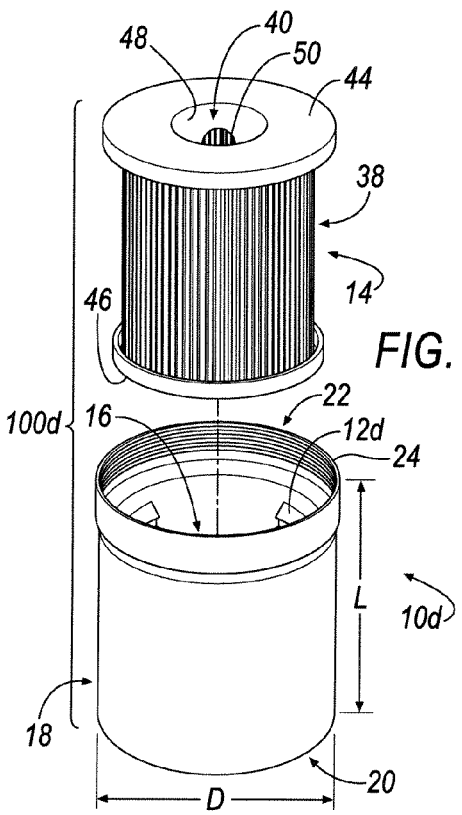
FIG. 1D is an exploded view of a filter assembly in accordance with an exemplary embodiment of the invention.
Figures 2A, 2B:
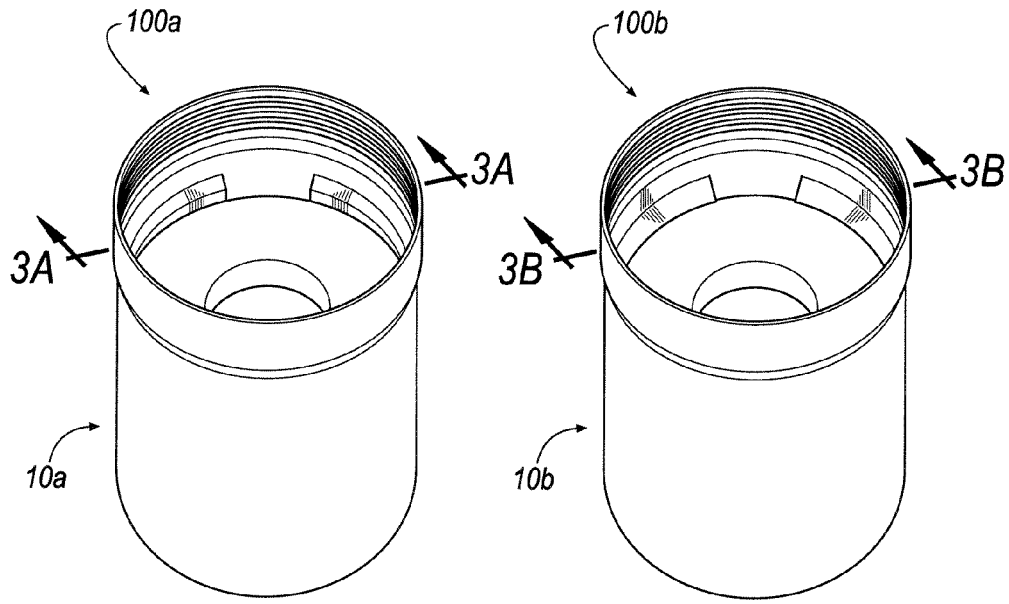
FIG. 2A is a perspective view of the filter assembly of FIG. 1A.
FIG. 2B is a perspective view of the filter assembly of FIG. 1B.
Figures 2C, 2D:
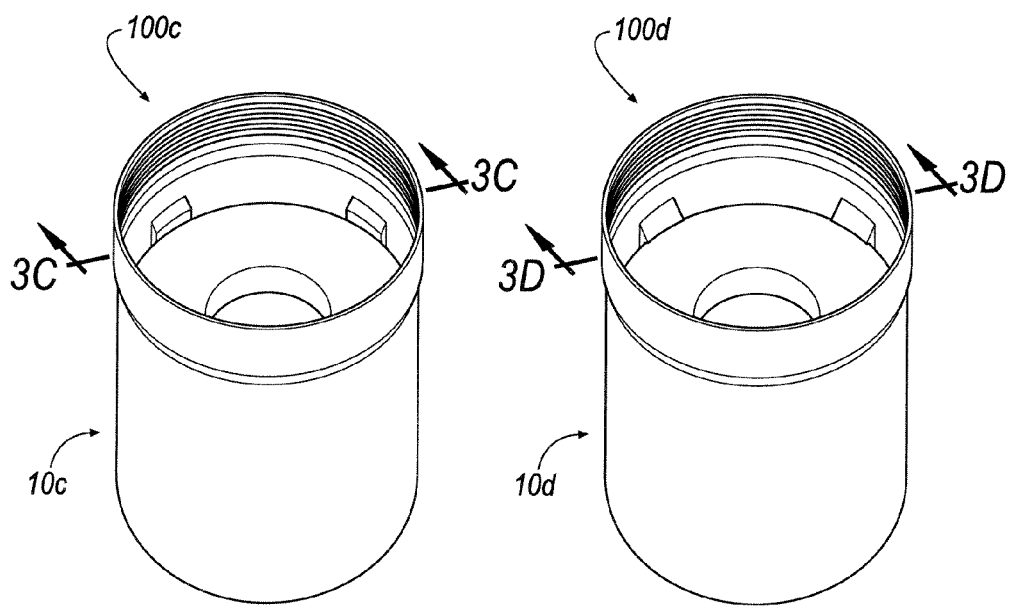
FIG. 2C is a perspective view of the filter assembly of FIG. 1C.
FIG. 2D is a perspective view of the filter assembly of FIG. 1D.

The Figures illustrate exemplary embodiments filter containers and a filter assembly in accordance with an embodiment of the invention. The disclosure hereof will illustrate and describe exemplary embodiments of a filter container, a filter assembly, and a method of manufacturing the same. According to an embodiment, the filter container includes one or more filter retaining elements for retaining a filter within a cavity defined by the filter container. Based on the foregoing, it is to be generally understood that the nomenclature used herein is simply for convenience and the terms used to describe the invention should be given the broadest meaning by one of ordinary skill in the art.

Referring to FIGS. 1A-2D, a filter container is shown generally at 10a-10d, respectively, according to various embodiments. In an embodiment, each filter container 10a-10d is generally defines a cylindrical shape having a circumferential wall portion 18, a closed-end wall portion 20, and a passage 22 defining an open end 24 that provides access to a cavity, which is shown generally at 16. As illustrated, the cavity 16 includes a dimension that is sized for receiving a filter, which is shown generally at 14. The dimension of the cavity 16 is generally defined by the length, L, and diameter, D, of the circumferential wall portion 18 and the closed-end wall portion 20.

Referring to FIGS. 3A-3D, the circumferential wall portion 18 defines an inner surface 26 and an outer surface 28. As illustrated, the inner surface 26 includes a threaded portion 30 and an inlet seal 32 proximate the passage 22. Although the threaded portion 30 and inlet seal 32 are shown disposed on the inner surface 26 proximate the passage 22, it will be appreciated that the threaded portion 30 and/or seal 32 may be disposed on the outer surface 28 in an alternative embodiment.

The inner surface 26 of each filter container 10a-10d is also defined by one or more filter retaining elements 12a-12d that retain the filter 14 in the filter container 10a-10d. As illustrated, each filter retaining element 12a-12d extends from the inner surface 26 toward a central axis, A-A. As illustrated, the central axis, A-A, extends through and defines a central axis of the container 10a-10d.

Figure 3A:
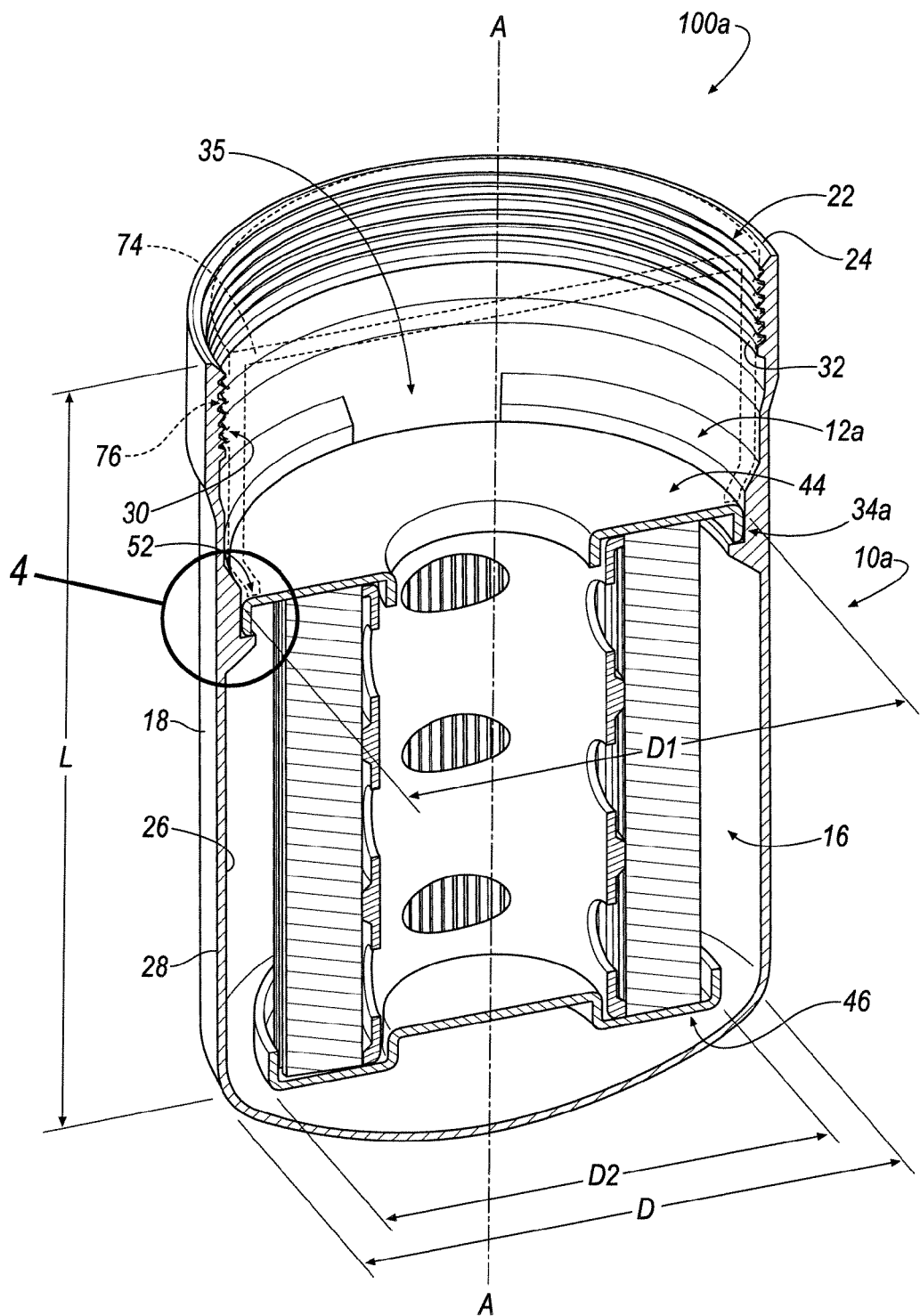
FIG. 3A is a cross-sectional view of the filter assembly according to line 3A-3A of FIG. 2A in accordance with an exemplary embodiment of the invention.
Figure 3B:
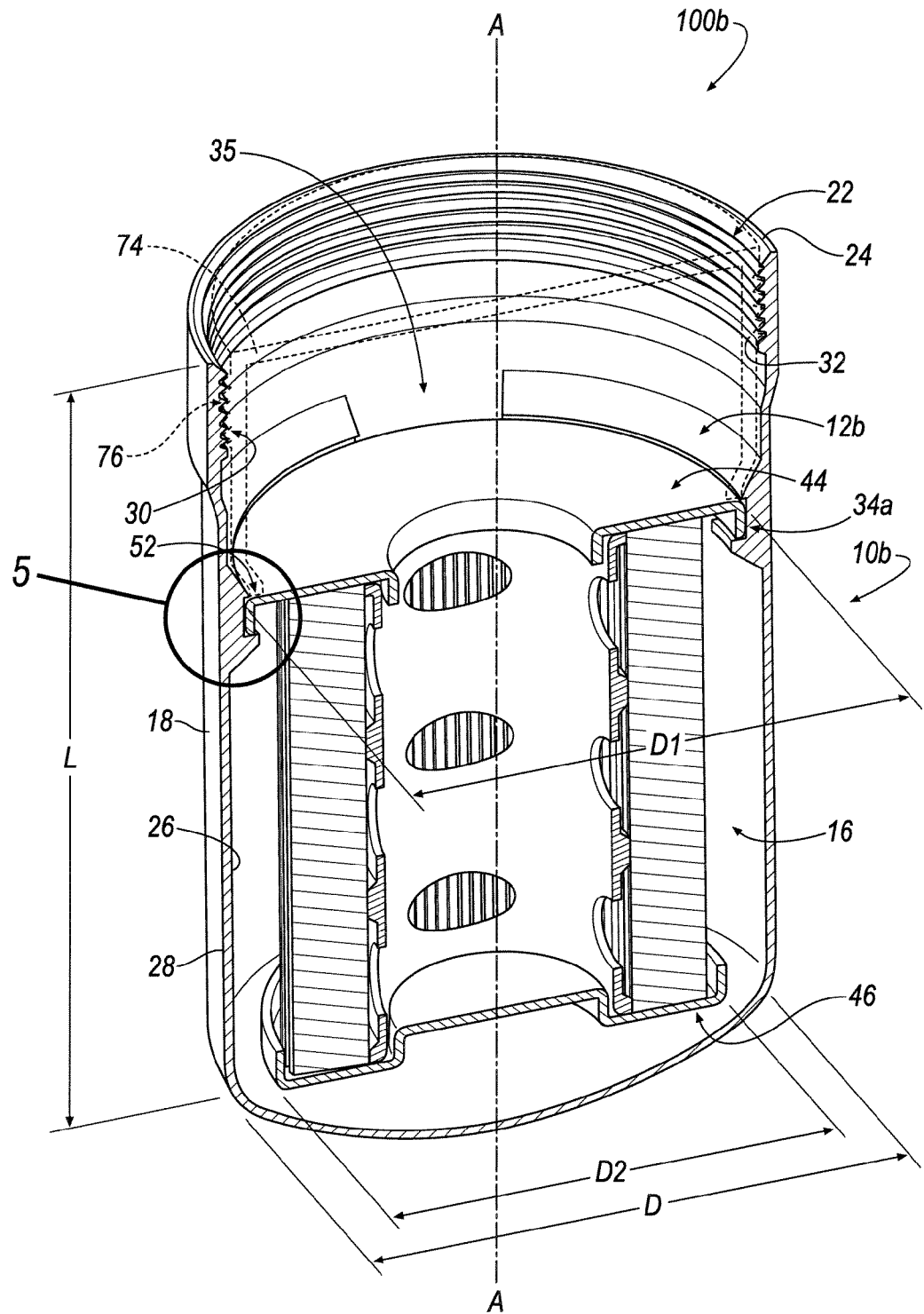
FIG. 3B is a cross-sectional view of the filter assembly according to line 3B-3B of FIG. 2B in accordance with an exemplary embodiment of the invention.

As illustrated in FIGS. 3A and 3B, each filter retaining element 12a, 12b defines a portion of a circumferential ring 34a having an interruption between each filter retaining element 12a, 12b, which are shown generally at 35, to provide a fluid-flow clearance gap. The circumferential ring 34a radially extends inwardly, from the inner surface 26, toward the central axis, A-A.

Figure 3C:
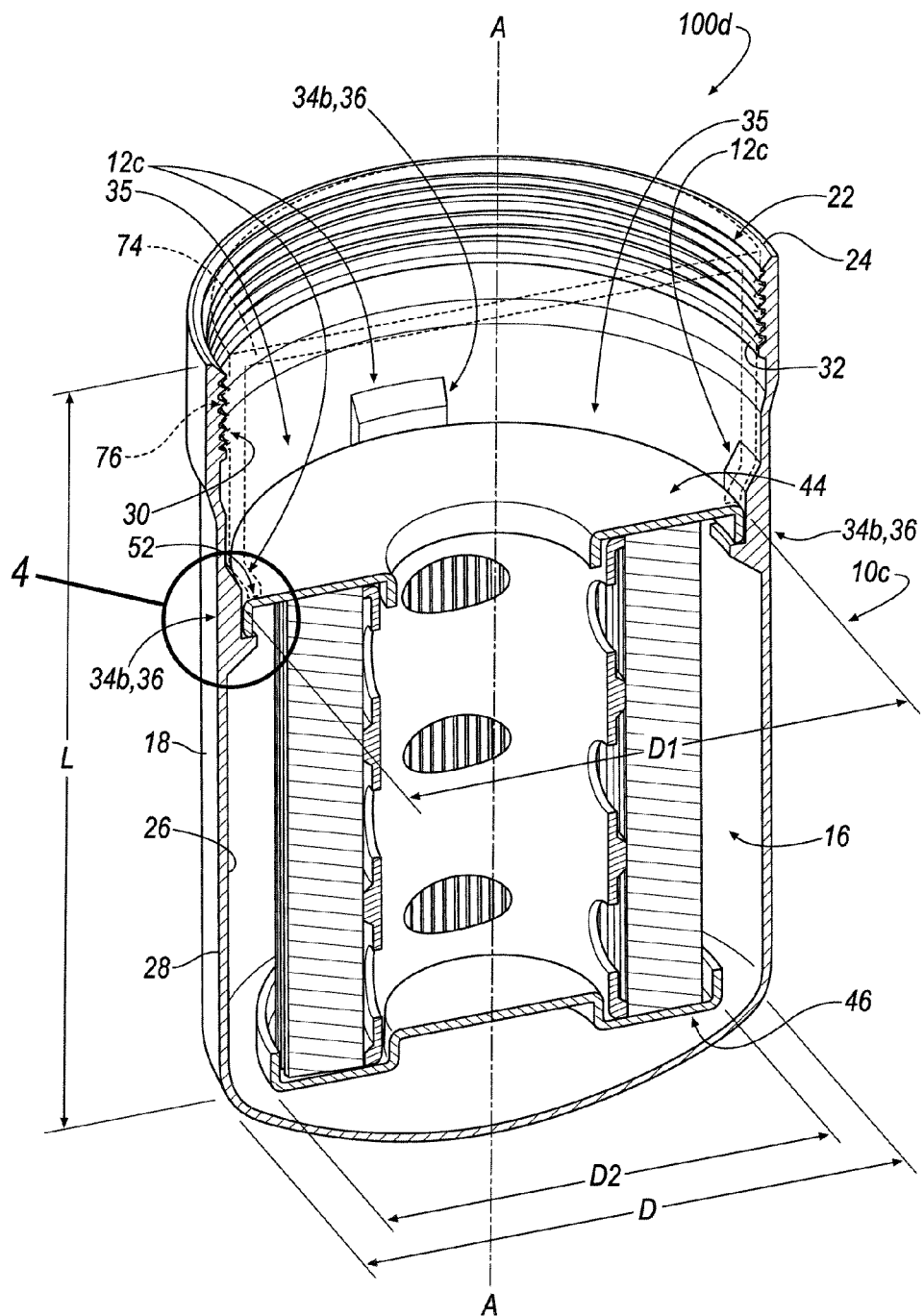
FIG. 3C is a cross-sectional view of the filter assembly according to line 3C-3C of FIG. 2C in accordance with an exemplary embodiment of the invention.
Figure 3D:
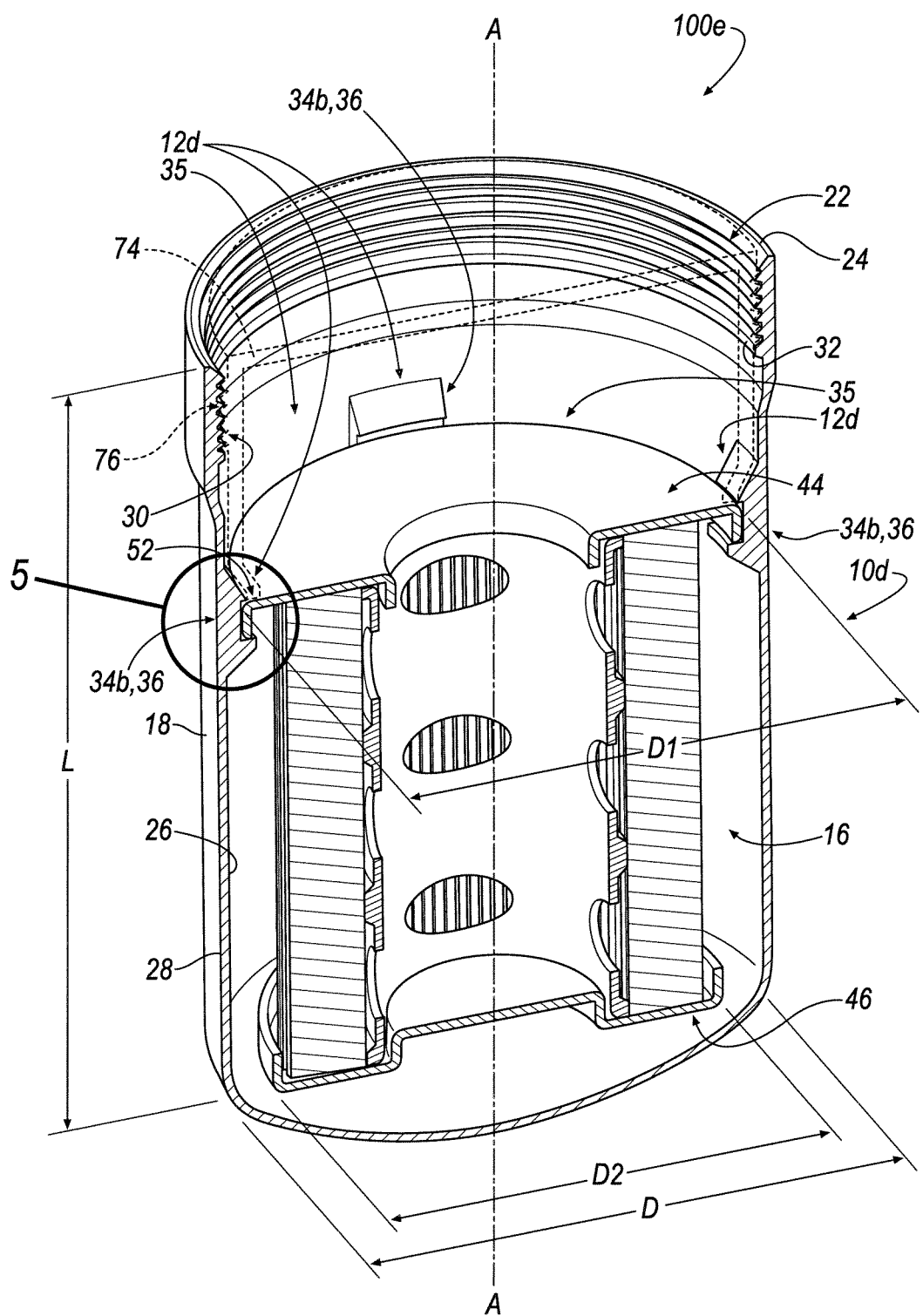
FIG. 3D is a cross-sectional view of the filter assembly according to line 3D-3D of FIG. 2D in accordance with an exemplary embodiment of the invention.

According to an embodiment, as illustrated in FIGS. 3C and 3D, a filter container 10c, 10d is shown including four filter retaining elements. As illustrated, each ring filter retaining element radially extends, from the inner surface 26, inwardly toward the central axis, A-A.

According to an embodiment, each of the four ring segment 36 may be spaced equidistantly. However, it will be appreciated upon considering the present disclosure that the number and spacing of filter retaining elements 35 is not limited to the above-described embodiment and that any desirable number or spacing of filter retaining elements 36 may be provided, as desired.

Referring back to FIGS. 1A-1D, the filter 14 is shown according to an embodiment. As illustrated, the filter 14 includes a pleated filter media 38 that is formed into a substantially cylindrical shape having a central passage 40.

With continued reference to FIGS. 1A-1D, in an embodiment, the filter 14 includes an upper end cap 44, and a lower end cap 46. In an embodiment, the filter 14 may include a central passage member 48 having a plurality of radial passages 50. Referring to FIGS. 3A-3D, the upper and lower end caps 44, 46 each include a lip portion 52 that axially extends from each upper and lower end cap 44, 46. According to an embodiment, the lip portion 52 of each upper and lower end cap 44, 46 axially extend toward each other.

According to an embodiment, as seen in FIGS. 2A-2D, the filter 14 is shown disposed in the cavity 16 of each filter container 10a-10d to define a filter assembly 100a-100d, respectively. When the filter 14 is disposed in the cavity 16 as shown in FIGS. 3A-3D, the substantially rigid lip portion 52 engages the one or more integrated filter retaining elements 12a-12d.

Figure 4:
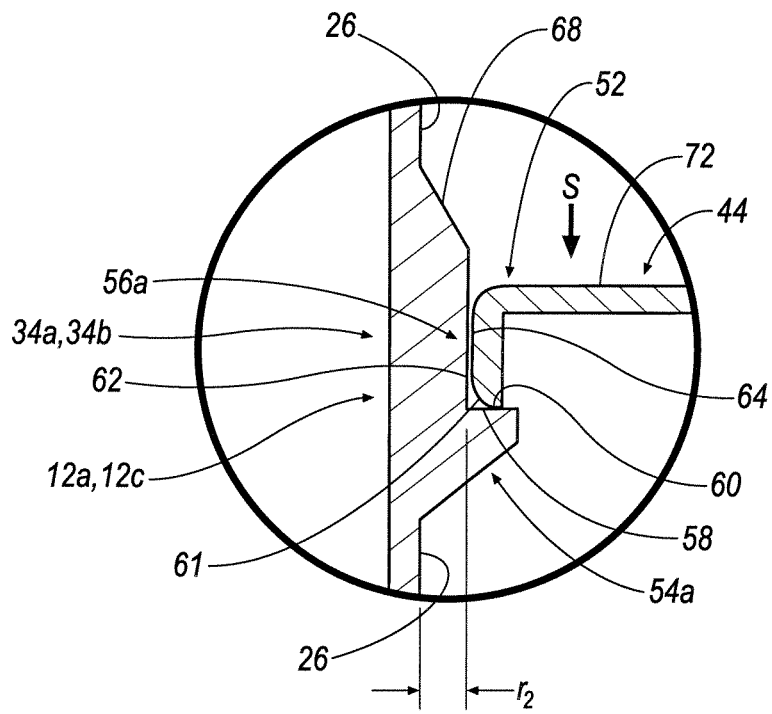
FIG. 4 is an enlarged cross-sectional view of FIGS. 3A and 3C according to line 4 in accordance with an exemplary embodiment of the invention.

Referring to FIG. 4, the one or more filter retaining elements 12a, 12c includes a shoulder 54a that defines an interface surface 56a of the ring 34a, 34b. According to an embodiment, the interface surface 56a includes a ledge surface 58 for engaging an inner surface or circumferential end 60 of the substantially rigid lip portion 52 and a wall surface 62 for engaging a side or circumferential perimeter 64 of the lip portion 52. In general, the ledge surface 58 and wall surface 62 are substantially perpendicular and define an L-shaped interface surface 56a. According to an embodiment, the lip portion 52 is correspondingly-sized to mate with at least one of the L-shaped interface surface 56a provided by the ledge surface 58 and wall surface 62.

Figure 5A:
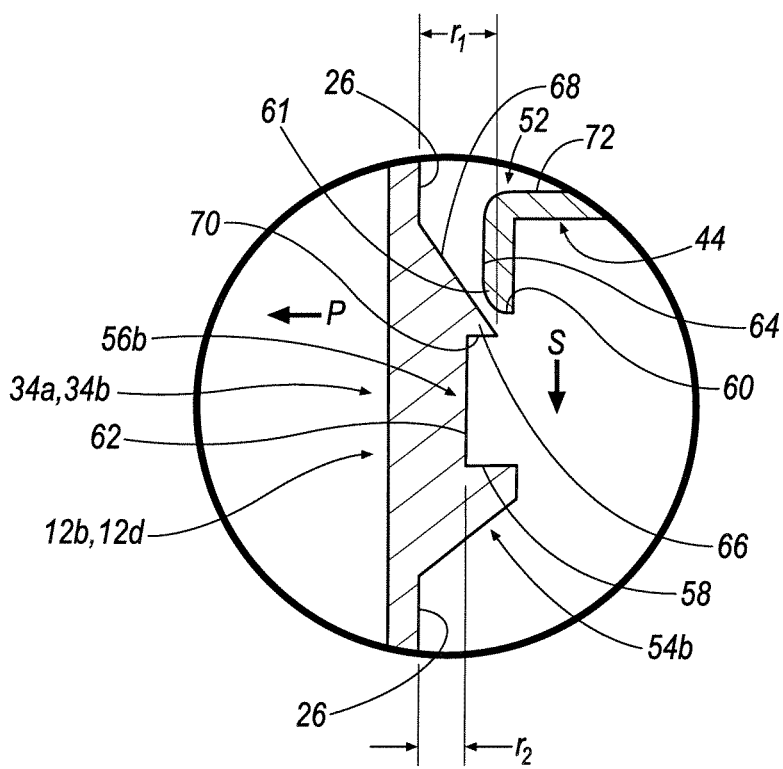
FIG. 5A is an enlarged cross-sectional view referenced generally according to line 5 in FIGS. 3B and 3D in accordance with an exemplary embodiment of the invention.
Figure 5B:
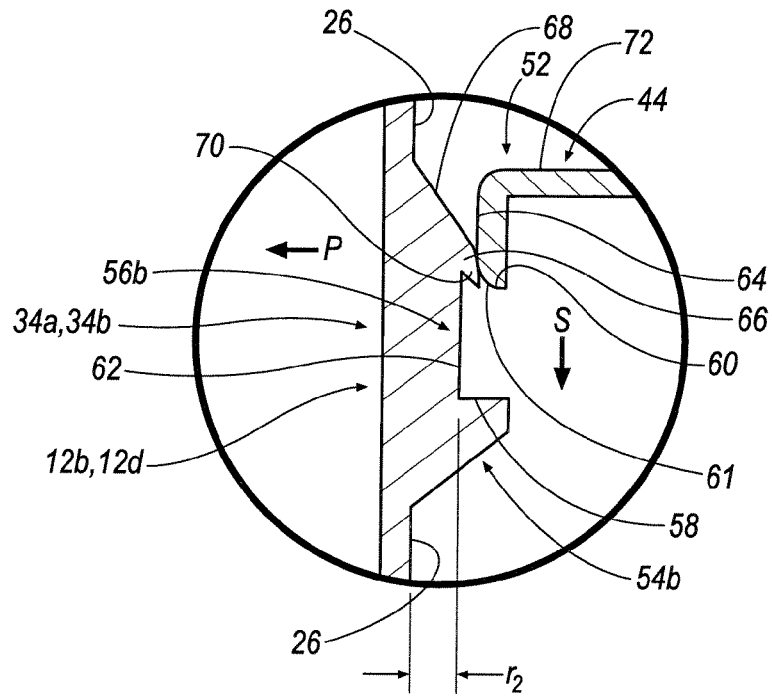
FIG. 5B is an enlarged cross-sectional view referenced generally according to line 5 in FIGS. 3B and 3D in accordance with an exemplary embodiment of the invention.
Figure 5C:
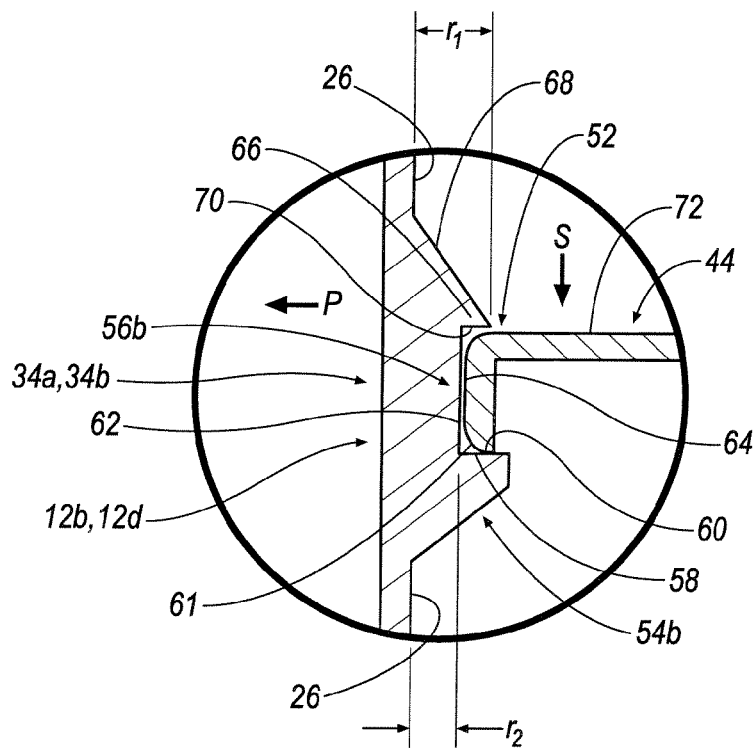
FIG. 5C is an enlarged cross-sectional view of FIGS. 3B and 3D according to line 5 in accordance with an exemplary embodiment of the invention.

According to an alternative embodiment, as seen in FIGS. 5A-5C, the one or more integrated filter retaining elements 12b, 12d include a shoulder 54b that defines an interface surface 56b of the ring 34a, 34b. According to an embodiment, the interface surface 56b includes a ledge surface 58 and a wall surface 62 for engaging, respectively, the circumferential end 60 and circumferential perimeter 64 of the lip portion 52. According to an embodiment, the lip portion 52 is correspondingly-sized to generally mate with at least one of the L-shaped interface surface 56b provided by the ledge surface 58 and wall surface 62.

In an embodiment, the interface surface 56b can include a means for locking the filter 14 to the container 10b, 10d, which is shown generally at 66. According to an embodiment, the locking means 66 may be referred to as a nose portion 66. In an embodiment, the nose portion 66 is defined by a ramp surface 68, which is proximate the passage 22, extending from the inner surface 26. As illustrated, the ramp surface 68 can extend from the inner surface 26, at a radial distance, $r_1$, toward the central axis, A-A. The wall surface 62 can extend from the inner surface 26, at a radial distance, $r_2$, toward the central axis, A-A. According to an embodiment, when referenced from the inner surface 26, the radial distance, $r_1$, is greater than, but may be approximately equal to the radial distance, $r_2$, of the wall surface 62.

Referring to FIGS. 3B, 3D, and 5C, the circumferential perimeter 64 of the upper end cap 44 may be defined, for example, by a diameter, D1, that is approximately equal to, but greater than a passage diameter, D2, of the cavity 16 that is defined by the ring 34a, 34b including the shoulder 54b and nose portion 66. According to an embodiment, the lower end cap 46 includes a diameter that is less than the diameter, D1, of the upper end cap 44. According to an embodiment, the diameter of the lower end cap 46 is approximately equal to or less than the diameter, D2, of the cavity 16. As such, because the passage diameter, D2, is smaller than the diameter, D1, of the upper end cap 44, the nose portion 66 may include an elastic characteristic that permits temporary deformation of the nose portion 66 (i.e., FIG. 5B) as the diameter, D1, of upper end cap 44 becomes engaged with the nose portion 66 that includes a smaller diameter, D2.

Figure 6:
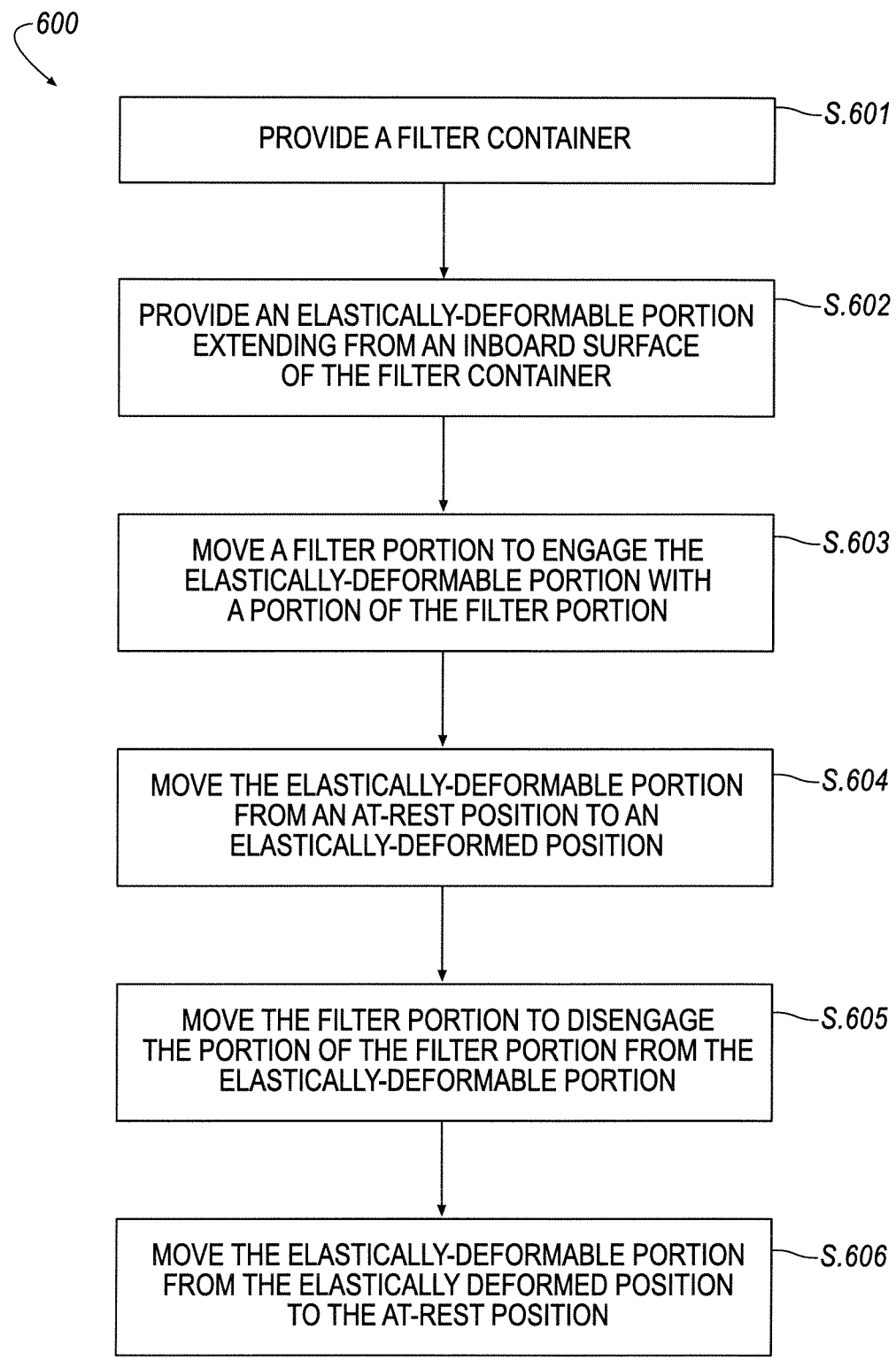
FIG. 6 is a flow chart illustrating a method for assembling a filter assembly in accordance with an exemplary embodiment of the invention.

Referring to FIGS. 5A-6, a method for assembling the filter assembly 100b, 100d is shown generally at 600 according to an embodiment. First, referring to FIGS. 5A and 5B, the circumferential end 60 of the substantially rigid lip portion 52 engages the ramp surface 68 (i.e., FIG. 5A and step S.603) according to the direction of the arrow, S. Then, as seen in FIG. 5B, the circumferential perimeter 64 of the substantially rigid lip portion 52 may cause the nose portion 66 (e.g., the "elastically-deformable portion" of steps S.602-S.606) to be moved (i.e., step S.604) in the direction of the arrow, S, and/or in a direction substantially perpendicularly away from the central axis, A-A, according to the direction of arrow, P.

If desired, the circumferential end 60 may include a rounded edge 61 to permit the substantially rigid lip portion 52 to pass the elastically-deformable nose portion 66 with less resistance. It will be appreciated that the rigid quality of the substantially rigid lip portion 52 resists bending or deformation of the circumferential end 60 and circumferential perimeter 64 while the nose portion 66 extending from the inner surface 26 of the container 10b, 10d is permitted to be elastically deformed during assembly of the filter assembly 100b, 100d.

Referring to FIG. 5C, once the circumferential end and perimeter 60, 64 of the lip portion 52 passes the nose portion 66 (i.e., steps S.605, S.606), an inner edge surface 70 of the nose portion 66 may engage an outer surface 72 of the upper end cap 44. In addition, once the circumferential end and perimeter 60, 64 of the lip portion 52 disengages the nose portion 66 as described above, the elastically-deformable nose 66 may move from an elastically-deformed position (i.e. FIG. 5B) to an original, at-rest position (i.e. FIG. 5C), causing an audible "snap" to be heard, thereby providing an audible alert that the filter 14 has been locked into place with the container 10b, 10d by way of the interface surface 56b. Thus, the nose portion 66 may also be referred to as a "snap-fit" locking arrangement integrated with the container 10b, 10d that locks the filter 14 in place relative the container 10b, 10d.

According to an embodiment, when the filter assembly 100a-100d is assembled as described above in FIGS. 4-5C, the lip portion 52 may be positioned adjacent the interface surface 56a, 56b by way of a force applied to the outer surface 72 of the upper end cap 44. According to an embodiment, the force applied to the outer surface 72 of the upper end cap 44 may be provided in the direction of the arrow, S, by hand, a tool, or the like of an installer.

Alternatively, according to an embodiment, as seen in FIGS. 3A-3D, the force, applied to the outer surface 72 of the upper end cap 44 in the direction of the arrow, S, may be directly provided by a close-out member 74 (shown in phantom), which may include a threaded portion 76 (also shown in phantom). According to an embodiment, the close-out member 74 may be a removable cap that is spun onto the threaded portion 30 of the filter container 10a-10d. According to another embodiment, the close-out member 74 may be a base portion interface extending from an internal combustion engine; as such, the filter container 10a-10d may be spun onto the close-out member 74 to directly apply a force in the direction of the arrow, S, to the outer surface 72 of the upper end cap 44.

Figure 7A:
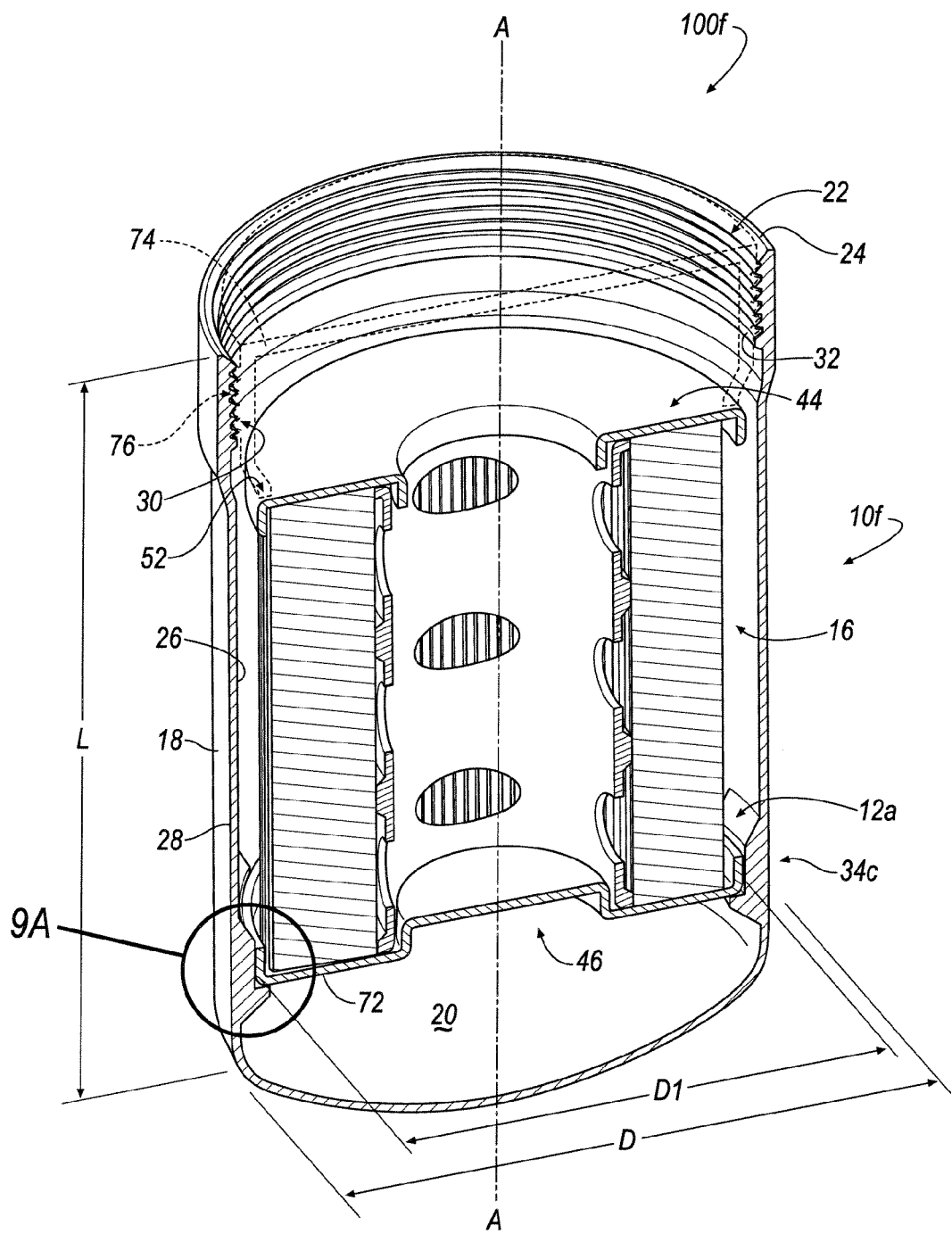
FIG. 7A is a cross-sectional view of a filter assembly in accordance with an exemplary embodiment of the invention.

Referring to FIG. 7A a filter assembly is shown generally at 100f according to an embodiment. The filter assembly 100f includes a filter container 10f including a circumferential ring 34c. Circumferential ring 34c of the filter container 10f is located proximate the closed end-wall portion 20 such that the circumferential ring 34c may engage the outer surface 72 of the lower end cap 46. By incorporating the circumferential ring proximate the closed end-wall portion 20 and retaining the filter 14 within the cavity on this end, the first end cap and the second end cap can bear an equal diameter without the pitfalls that would be typically associated with retaining the filter by the other cap.

Figure 9A:
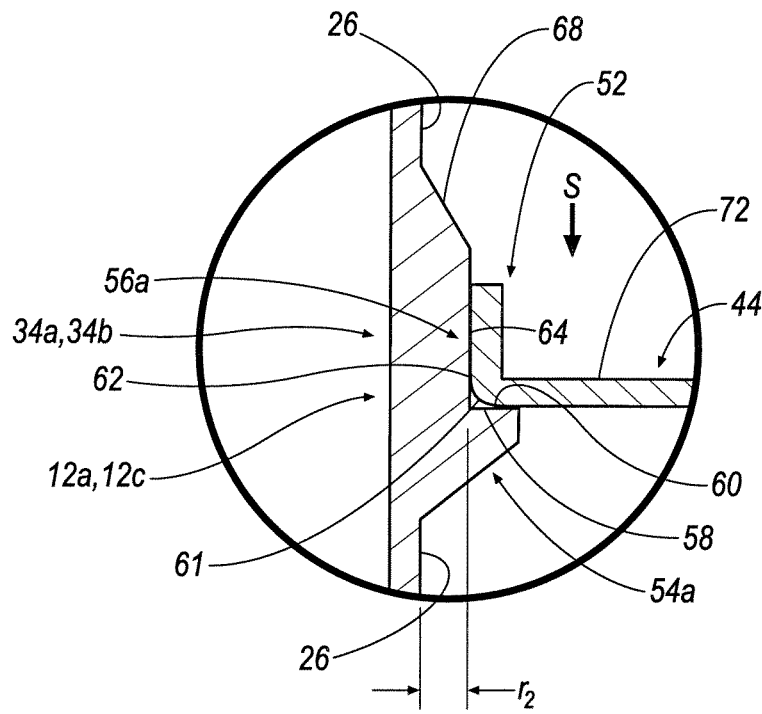
FIG. 9A is an enlarged cross-sectional view of FIG. 7A in accordance with an exemplary embodiment of the invention.

Referring to FIG. 9A, the one or more filter retaining elements 12a, 12c includes a shoulder 54a that defines an interface surface 56a of the ring 34a, 34b. According to an embodiment, the interface surface 56a includes a ledge surface 58 for engaging an inner surface or circumferential end 60 of the substantially rigid lip portion 52 and a wall surface 62 for engaging a side or circumferential perimeter 64 of the lip portion 52. In general, the ledge surface 58 and wall surface 62 are substantially perpendicular and define an L-shaped interface surface 56a. According to an embodiment, the lip portion 52 is correspondingly-sized to mate with at least one of the L-shaped interface surface 56a provided by the ledge surface 58 and wall surface 62.

Figure 7B:
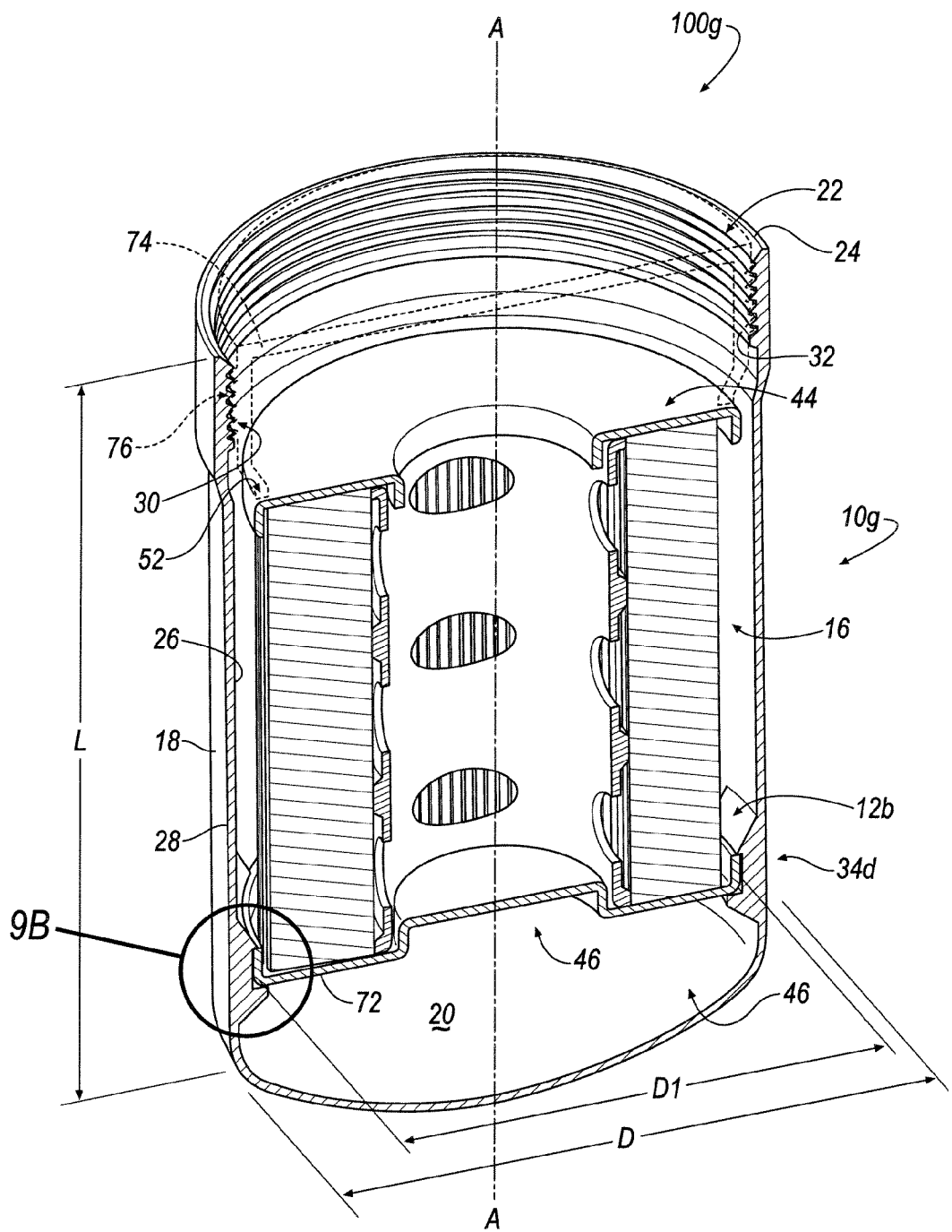
FIG. 7B is a cross-sectional view of the filter assembly in accordance with an exemplary embodiment of the invention.

Referring to FIG. 7B, a filter assembly is shown generally at 100g according to an embodiment. The filter assembly 100g includes a filter container 10g including a circumferential ring 34d. The circumferential ring 34d of the filter container 10g is located proximate the closed end-wall portion 20 such that the circumferential ring 34d may engage the outer surface 72 of the lower end cap 46.

Figure 8A:
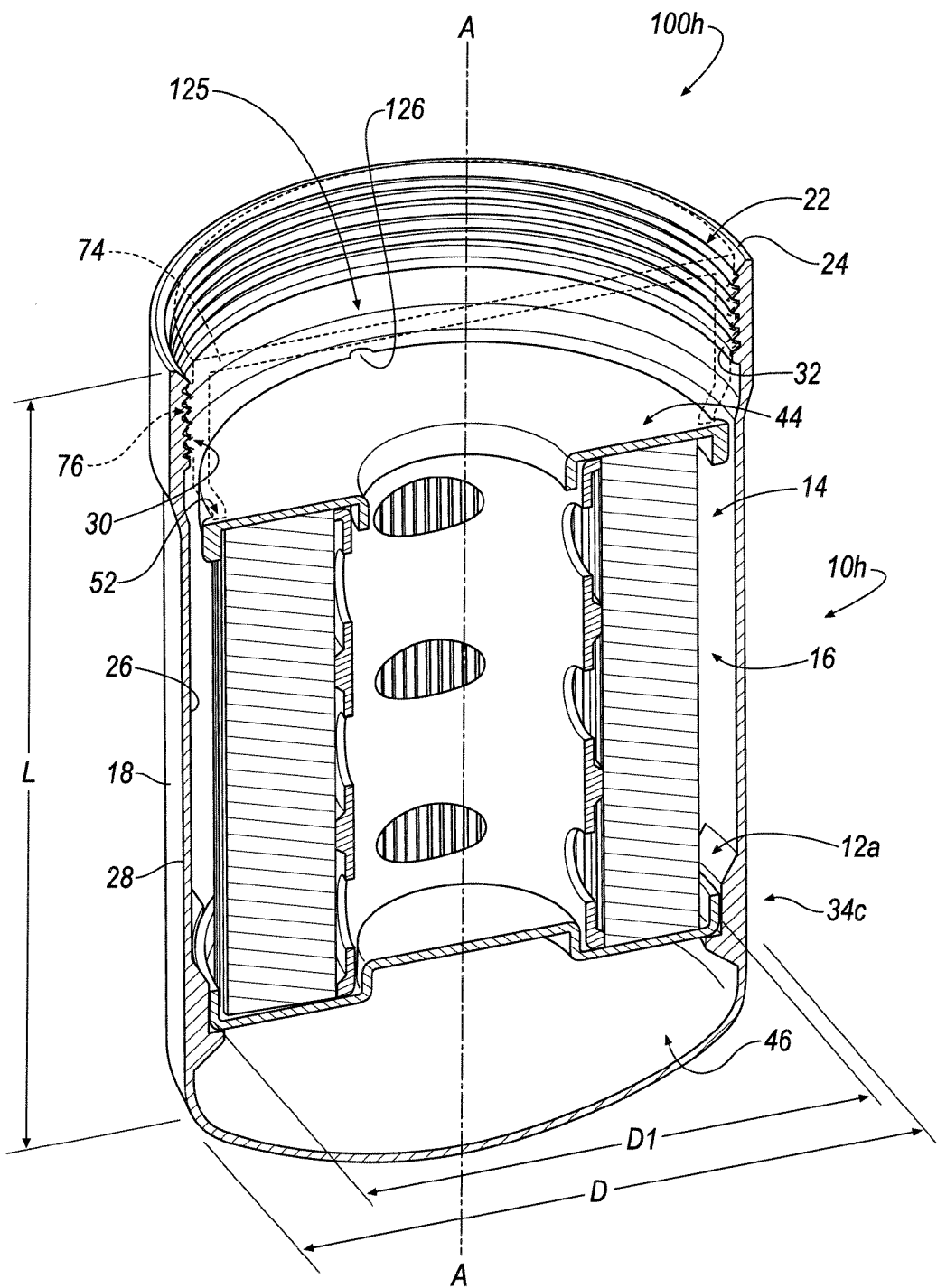
FIG. 8A is a cross-sectional view of the filter assembly in accordance with an exemplary embodiment of the invention.
Figure 8B:
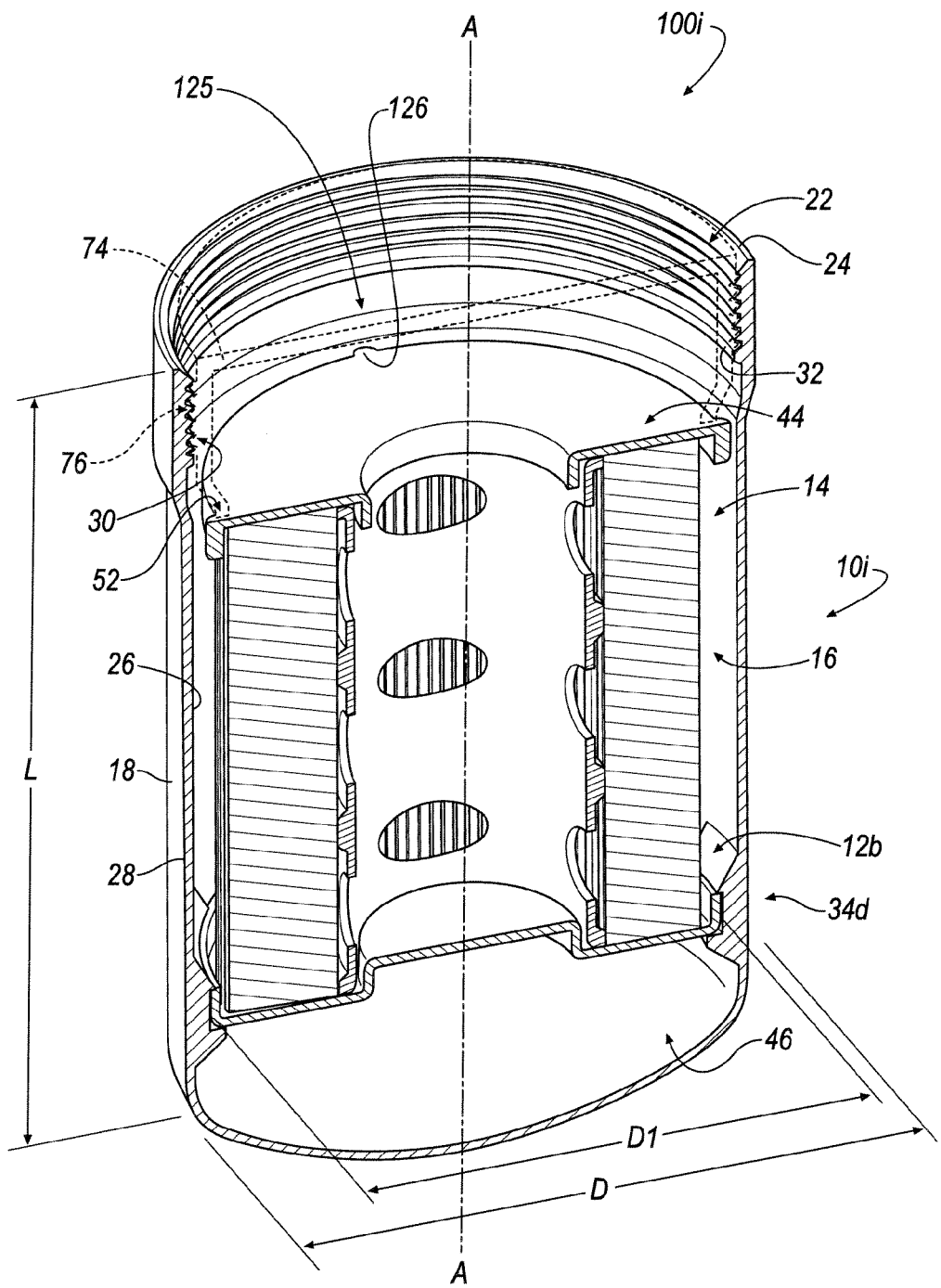
FIG. 8B is a cross-sectional view of the filter assembly in accordance with an exemplary embodiment of the invention.
Figure 9B:
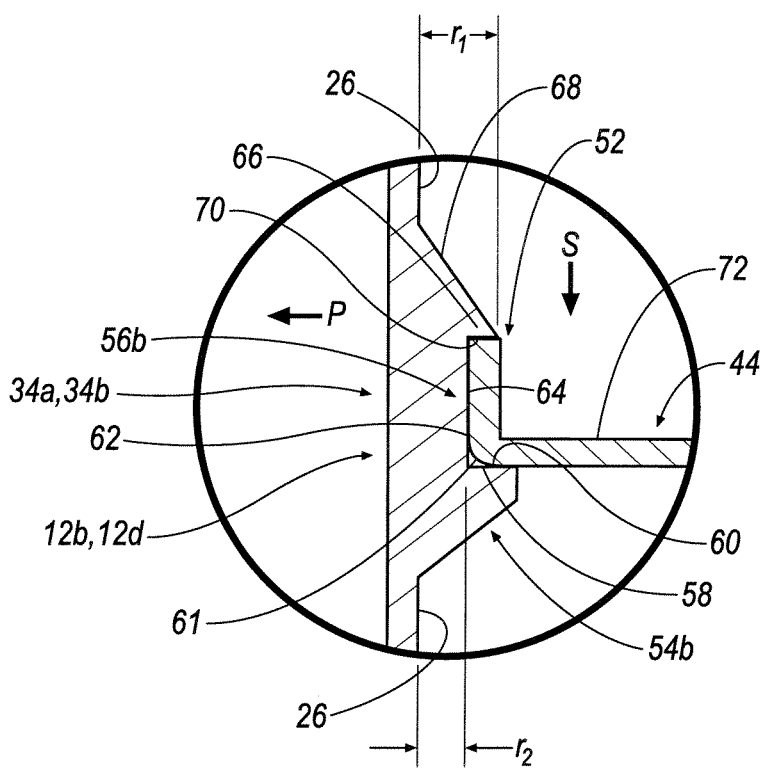
FIG. 9B is an enlarged cross-sectional view of FIG. 7B in accordance with an exemplary embodiment of the invention.

According to the embodiment depicted in FIGS. 7B, 8B and 9B, the one or more integrated filter retaining elements 12b, 12d include a shoulder 54b that defines an interface surface 56b of the ring 34a, 34b. According to an embodiment, the interface surface 56b includes a ledge surface 58 and a wall surface 62 for engaging, respectively, the circumferential end 60 and circumferential perimeter 64 of the lip portion 52. According to an embodiment, the lip portion 52 is correspondingly-sized to generally mate with at least one of the L-shaped interface surface 56b provided by the ledge surface 58 and wall surface 62.

In an embodiment, the interface surface 56b can include a means for locking the filter 14 to the container 10b, 10d, which is shown generally at 66. According to an embodiment, the locking means 66 may be referred to as a nose portion 66. In an embodiment, the nose portion 66 is defined by a ramp surface 68, which is proximate the passage 22, extending from the inner surface 26. As illustrated, the ramp surface 68 can extend from the inner surface 26, at a radial distance, $r_1$, toward the central axis, A-A. The wall surface 62 can extend from the inner surface 26, at a radial distance, $r_2$, toward the central axis, A-A. According to an embodiment, when referenced from the inner surface 26, the radial distance, $r_1$, is greater than, but may be approximately equal to the radial distance, $r_2$, of the wall surface 62.

Referring to FIGS. 8A and 8B a filter assembly is shown generally at 100h and 100i according to an embodiment. The filter assembly 100h includes one or more centering elements 125 for aligning the filter 14 in the filter container 10h. In an embodiment, the centering elements 125 are generally defined by one or more projections 126 that radially extend from the end caps 44 relatingly engage the inner structure 26 and center the end cap 44 formed within the inner surface 26 of the filter container 10h.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A filter container for a filter element, the filter container comprising:
    a one-piece container wall having a non-constant thickness defining a mouth and a cavity for receiving the filter element, wherein an inner wall surface of the one-piece container wall defines:
        an inlet seal arranged at a distance away from the mouth,
        a threaded portion extending between the mouth and the inlet seal, and
        one or more filter retaining elements extending from the inner wall surface at a distance below the inlet seal that is arranged below the threaded surface and the mouth, wherein the one or more filter retaining elements are arranged inside the cavity, wherein the one or more filter retaining elements each comprise:
            a shoulder extending radially inward from the inner wall surface toward a central axis defined by the filter container, the shoulder having a shoulder wall surface substantially concentric with the inner wall surface and a ledge surface substantially perpendicular to the inner wall surface for supporting a received filter element; and
            a nose extending radially inward from the inner wall surface and spaced from the shoulder along the central axis toward the mouth, the nose having a ramp surface extending at an angle from the inner wall surface away from the mouth and a retaining surface facing opposite of the ledge surface of the shoulder;
        wherein the ramp surface extends radially inward from the inner wall surface to a first radial distance and the shoulder wall surface is disposed radially inward from the inner wall surface at a second radial distance, the first radial distance greater than or equal to the second radial distance.

2. The filter container according to claim 1, wherein the filter container includes a closed end and generally a generally open end, and wherein the one or more filter retaining elements are proximate the closed end.

3. The filter container according to claim 2, further comprising a filter retained by the one or more filter retaining elements.

4. The filter container according to claim 3, wherein the filter includes first and second end caps at axial ends, and wherein the end caps have equal diameters, and further wherein the filter retaining elements retain the filter by one of the first and second end caps.

5. The filter container according to claim 1, wherein the one-piece container wall defines a fluid-flow passage between two adjacent filter retaining elements.

6. A filter assembly comprising:
a filter including a filter media and a filter media end cap;
a filter container including a one-piece container wall having a non-constant thickness that defines a mouth and a cavity adapted to receive the filter, wherein an inner wall surface of the one-piece container wall defines:
an inlet seal arranged at a distance away from the mouth,
a threaded portion extending between the mouth and the inlet seal, and
one or more filter retaining elements integrally-extending from the inner wall surface at a distance below the inlet seal that is arranged below the threaded surface and the mouth, wherein the one or more filter retaining elements are arranged inside the cavity, the one or more filter retaining elements each comprising:
a shoulder for interfacing with the filter media end cap, the shoulder extending radially inward from the inner wall surface toward a central axis defined by the filter container, the shoulder having a shoulder wall surface substantially concentric with the inner wall surface and a ledge surface substantially perpendicular to the inner wall surface for supporting the received filter element; and
a nose extending radially inward from the inner wall surface and spaced from the shoulder along the central axis toward the mouth, the nose having a ramp surface extending at an angle from the inner wall surface away from the mouth and a retaining surface facing opposite of the ledge surface of the shoulder;
wherein the ramp surface extends radially inward from the inner wall surface to a first radial distance and the shoulder wall surface is disposed radially inward from the inner wall surface at a second radial distance, the first radial distance is greater than or equal to the second radial distance.

7. The filter assembly according to claim 6, wherein the filter media end cap includes a lip portion that extends perpendicularly from the end cap, the lip portion having a circumferential end and a circumferential perimeter.

8. The filter assembly according to claim 6, wherein the one-piece container wall defines a fluid-flow passage between two adjacent filter retaining elements.

9. The filter assembly according to claim 6, further comprising a close-out member having a threaded portion that interfaces with the threaded portion of the inner wall surface of the one-piece container wall.

10. The filter assembly according to claim 9, wherein the close-out member comprises a removable cap.

11. The filter assembly according to claim 9, wherein the close-out member comprises a base portion interface extending from an internal combustion engine.

12. A method for assembling a filter assembly, the method comprising:
providing a filter container including a one-piece container wall having a non-constant thickness that defines a mouth and a cavity;
forming an inner wall surface of the one-piece container wall to define:
an inlet seal arranged at a distance away from the mouth, and
a threaded surface extending between the mouth and the inlet seal, and
one or more filter retaining elements extending from the inner wall surface at a distance below the inlet seal that is arranged below the threaded surface and the mouth, wherein the one or more filter retaining elements are arranged inside the cavity, each filter retaining element comprising:
a shoulder extending radially inward from the inner wall surface toward a central axis defined by the filter container, the shoulder having a shoulder wall surface substantially concentric with the inner wall surface and a ledge surface substantially perpendicular to the inner wall surface for supporting a received filter element; and
a nose extending radially inward from the inner wall surface and spaced from the shoulder along the central axis toward the mouth, the nose having a ramp surface extending at an angle from the inner wall surface away from the mouth and a retaining surface facing opposite of the ledge surface of the shoulder;
wherein the ramp surface extends radially inward from the inner wall surface to a first radial distance and the shoulder wall surface is disposed radially inward from the inner wall surface at a second radial distance, the first radial distance greater than or equal to the second radial distance;
inserting a filter in the cavity; and
locking the filter to the inner wall surface using at least the one or more filter retaining elements.

13. The method according to claim 12, further comprising:
moving the filter to engage the one or more filter retaining elements with a portion of the filter,
moving the one or more filter retaining elements from an at-rest position to an elastically-deformed position.

14. The method according to claim 13, further comprising:
disengaging the filter from the one or more filter retaining elements, and
moving the one or more filter retaining elements from the elastically deformed position to the at-rest position.

* * * * *

UNITED STATES PATENT AND TRADEMARK OFFICE
CERTIFICATE OF CORRECTION

| | | |
|---|---|---|
| PATENT NO. | : 8,747,665 B2 | Page 1 of 1 |
| APPLICATION NO. | : 11/626586 | |
| DATED | : June 10, 2014 | |
| INVENTOR(S) | : Darrell T. McKenzie | |

It is certified that error appears in the above-identified patent and that said Letters Patent is hereby corrected as shown below:

In the Claims:

At column 7, claim number 6, line number 50, after the phrase the first radial distance, delete the word "is".

Signed and Sealed this
Ninth Day of September, 2014

Michelle K. Lee
*Deputy Director of the United States Patent and Trademark Office*